Feb. 2, 1965  E. F. JAGDMANN  3,168,468
FILTER ASSEMBLY FOR TRANSMISSIONS
Filed May 12, 1961  3 Sheets-Sheet 1

INVENTOR.
EDWIN F. JAGDMANN
BY John R. Faulkner
Donald J. Harrington
ATTORNEYS.

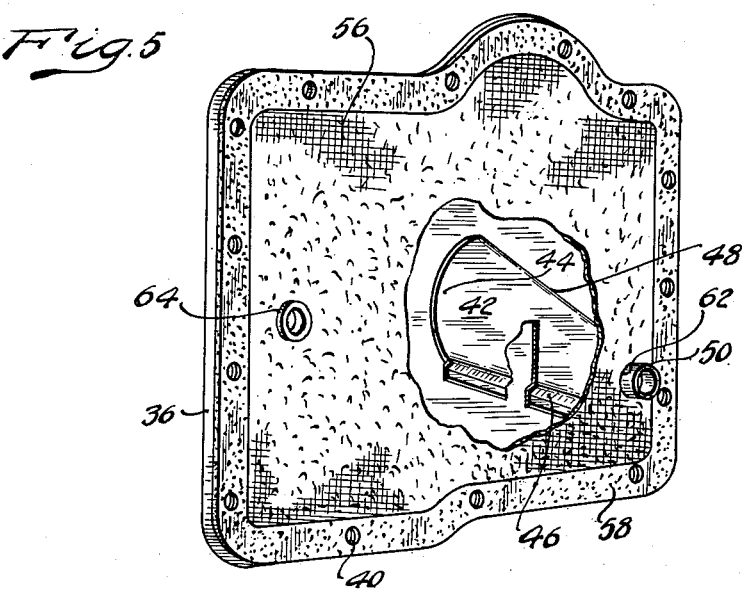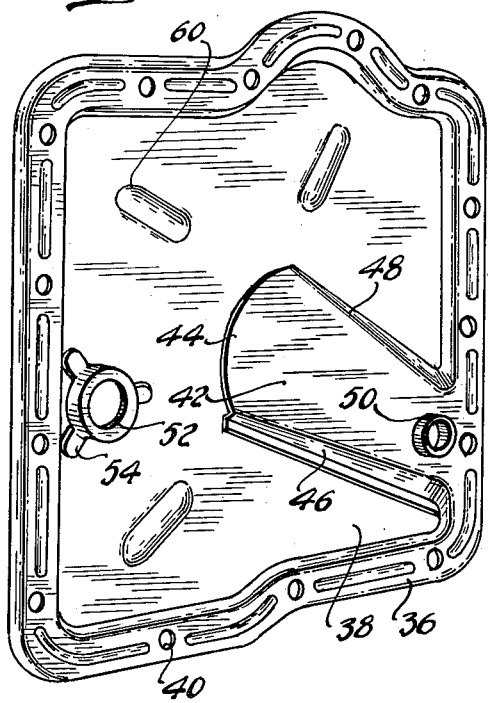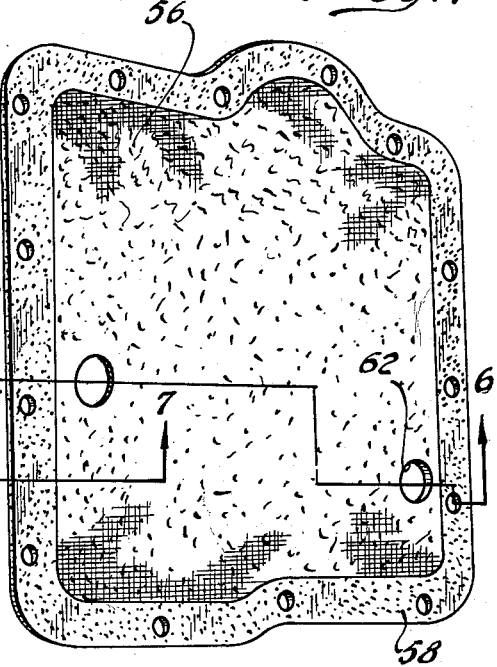

Feb. 2, 1965     E. F. JAGDMANN     3,168,468
FILTER ASSEMBLY FOR TRANSMISSIONS
Filed May 12, 1961     3 Sheets-Sheet 3
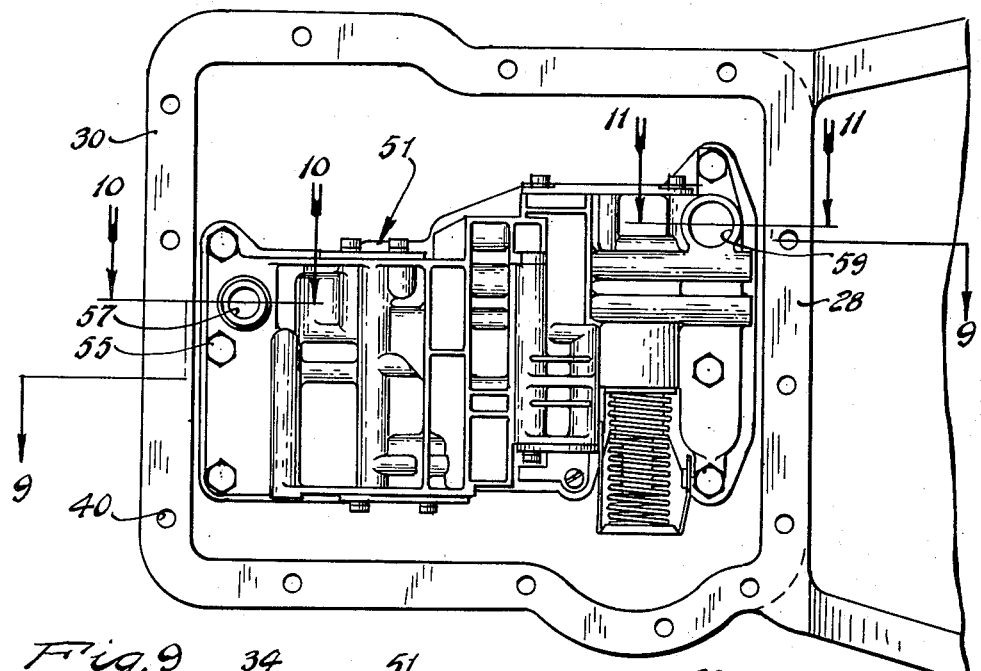
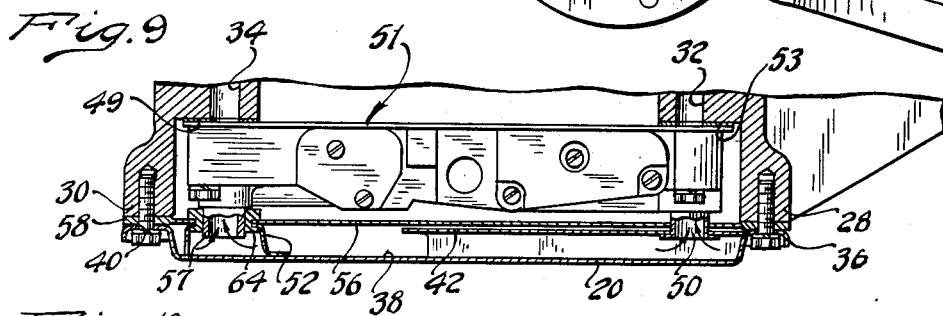
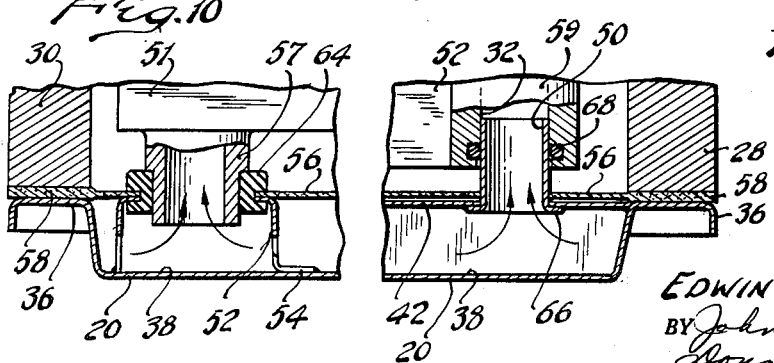
INVENTOR.
EDWIN F. JAGDMANN
BY John R. Faulkner
Donald J. Harrington
ATTORNEYS.

United States Patent Office 3,168,468
Patented Feb. 2, 1965

3,168,468
FILTER ASSEMBLY FOR TRANSMISSIONS
Edwin F. Jagdmann, Detroit, Mich., assignor to Ford Motor Company, Dearborn, Mich., a corporation of Delaware
Filed May 12, 1961, Ser. No. 109,690
1 Claim. (Cl. 210—168)

My invention relates generally to fluid flow systems and more particularly to a fluid filter assembly. It is adapted to be used with automatic power transmission mechanisms having fluid pressure control circuits.

Automatic power transmission mechanisms of the automotive type normally comprise planetary gear elements that define torque delivery paths extending from a power input shaft to a power output shaft. The relative motion of the planetary gear elements is controlled by clutch or brake mechanisms that in turn are actuated by fluid pressure operated servos. A suitable control system is provided in such transmission mechanisms for the purpose of controlling the distribution of fluid pressure to the various clutch or brake servos.

For the purpose of providing a fluid pressure source for the servos, such mechanisms include an engine driven pump or a tailshaft driven pump, or both, together with suitable passage structure extending from the discharge side of the pump to the fluid pressure servos. Automatic control valve elements are situated in and partly define this passage structure. The valve elements are situated in a valve body that is located normally in a transmission sump or fluid reservoir. The discharge side of the pump is in fluid communication with the sump while the fluid pressure intake side of the pump communicates with the sump through an appropriate fluid pressure supply passage.

It is conventional practice to provide a fluid filter in the form of a screen in the transmission sump in order to prevent foreign matter from entering into the fluid pressure circuit of the transmission control system. The sump is defined by an oil pan secured by bolts to the underside of the power transmission casing.

According to the improvement of my instant invention, I have eliminated the need for providing an oil screen of the conventional type and have provided an improved filtering means whereby particles of foreign matter in a relatively small size range (for example, 50 to 100 microns) will be filtered out of the fluid before it enters the intake side of the pump. By providing such an improved filter arrangement, I make it possible to reduce costly service problems associated with production type automatic transmissions. Such service problems are caused to a large extent by foreign matter entering into the hydraulic system of the transmission.

I have accomplished an improved filtering action by employing a Dacron cloth oil filter element. This cloth is situated between the intake side of the pump and the body of the reservoir fluid.

The periphery of the Dacron cloth can function as a gasket between the oil pan and the cooperating surface of the transmission casing. This eliminates the need for providing a separate gasket for this purpose. The oil pan itself can be formed with suitable bosses for the purpose of supporting the Dacron cloth when it is stretched over the surface of the oil pan. Further, the intake side of the pump can be caused to communicate with any desired region of the sump by means of suitable baffle structure that can be formed in a permanent fashion on the interior of the oil pan at a location below the Dacron filter cloth.

The provision of an improved filter system of the type above described being a principal object of my invention, it is a further object of my invention to provide a simplified fluid filter system having a synthetic fiber filtering element and which is characterized by a relatively large filtering area.

It is a further object of my invention to provide a filter assembly for use in a mechanism of the type above described wherein the outer margin of the assembly is impregnated with a suitable resin or rubber-like compound for the purpose of conditioning the same to function as a fluid gasket between the transmission casing and the associated oil pan.

It is a further object of my invention to provide a fluid filter for a fluid pressure system wherein the filtering medium comprises a synthetic filter cloth and wherein the outer margin of the cloth is adapted to function as a fluid gasket that may be positioned between two separable portions that define cavities on either side of the cloth.

It is a further object of my invention to provide a filter assembly for an automatic power transmission mechanism that is capable of filtering relatively small foreign particles from the fluid for the transmission control circuit without an excessive pressure drop across the filter element during the filtering action.

It is a further object of my invention to provide a filter assembly for an automatic power transmission mechanism that is of simplified contruction and which can be readily asembled during manufacture and during servicing operations.

It is a further object of my invention to provide a filter assembly for an automatic power transmission mechanism which functions also as a gasket element for the oil pan associated with the transmission mechanism.

Other objects of my invention will become apparent readily from the following description and from the accompanying drawings wherein:

FIGURE 3 is a view showing an oil pan for the transmission of FIGURES 1 and 2 as viewed from the topside;

FIGURE 4 is a view showing a Dacron cloth filter element that is adapted to be used with the oil pan of FIGURE 3;

FIGURE 5 shows a filter cloth assembled over a transmission oil pan;

FIGURE 8 is a view showing the underside of the transmission of FIGURE 1 with the oil pan removed but with the valve body situated in place;

FIGURE 9 is a cross sectional view of the transmission oil pan and is taken along section line 9—9 of FIGURE 8;

FIGURE 10 is a partial cross sectional view through a pump inlet port and is taken along section line 10—10 of FIGURE 8; and FIGURE 11 is a partial cross sectional view of a second pump inlet port and is taken along section line 11—11 of FIGURE 8.

Figure 1:
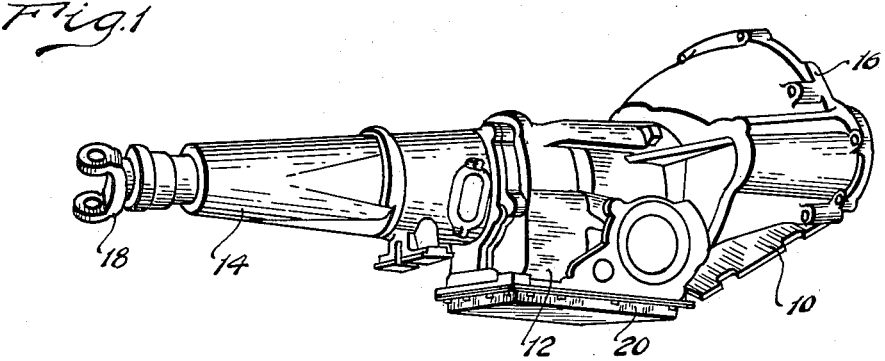
FIGURE 1 is a view showing the exterior of a power transmission mechanism for an automotive vehicle.

Referring first to FIGURE 1, the transmission mechanism is enclosed within a casing formed in three parts that are identified separately by numerals 10, 12 and 14. The parts 10, 12 and 14 are bolted in end to end relationship to form a unitary transmission casing.

The casing part 10 encloses a hydrodynamic torque converter unit having a pump member that is connected to an engine crankshaft. A flange 16 on the part 12 is adapted to be bolted to the cylinder block for the engine.

Casing part 12 encloses the transmission gear elements that distribute driving torque from the turbine member of the torque converter unit to a tailshaft enclosed by casing part 14, the end of the tailshaft carrying a universal joint yoke shown at 18.

The casing part 12 encloses also clutch and brake elements for controlling the relative motion of the gear elements.

The control valve body for regulating the action of the servos is enclosed in an oil pan 20 that is bolted to the underside of the casing part 12. The pan 20 defines an oil sump.

Figure 2:
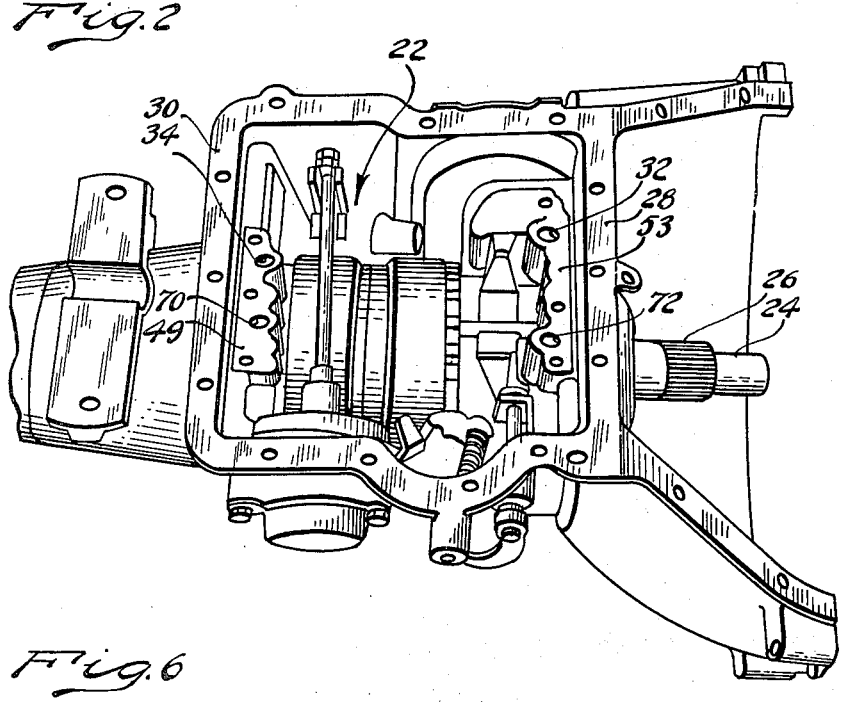
FIGURE 2 shows a view of the underside of the transmission of FIGURE 1 with the oil pan and valve body removed.
Figure 6:
FIGURE 6 is a cross sectional view of the filter cloth of FIGURE 4.
Figure 7:
FIGURE 7 is an enlarged partial cross sectional view of the margin of the filter cloth of FIGURE 6.

Referring next to FIGURE 2, the assembly of gear elements is identified generally by reference numeral 22. The torque converter turbine member is connected drivably to a shaft 24 that in turn is connected to a power input element of the assembly 22. The pump member for the torque converter unit is connected to the sleeve shaft 26. Shaft 26 in turn is connected drivably to an engine driven pump mounted within a partition wall 28 of the transmission casing. In a similar fashion, a tailshaft driven rear pump is mounted within an end wall 30 of the transmission casing part 12.

Fluid is supplied to the front pump through a suitable port 32 and fluid is supplied to the rear pump through a port 34. These ports 32 and 34 are formed in the housing structure for the front and rear pumps respectively.

Referring next to FIGURE 3, I have shown a top view of the oil pan that is adapted to be bolted to the bottom of the transmission casing part 12. The oil pan comprises a peripheral portion 36 and a dished central portion 38. A plurality of bolt holes 40 is provided in the peripheral portion 36 to facilitate bolting of the pan to the casing portion 12.

A baffle or scoop is shown at 42. It comprises a main portion in the form of a plate 44 disposed in a plane spaced from the plane of the central portion 38, the margins 46 and 48 being deformed for this purpose. These margins form a spacer between the plate 44 and the central portion 38, and they may be brazed or otherwise secured to the central portion 38 so that the baffle 42 defines a passage or scoop extending from a central region of the portion 38 to an upstanding circular duct 50.

A duct is provided also for the port 34 for the tailshaft driven rear pump. This duct is defined in part by a collar 52 that is spot welded or otherwise secured to the inner surface of the central pan portion 38. The collar 52 may be formed with tabs 54 to facilitate spot welding.

Referring next to FIGURE 8, a die cast valve body is shown generally at 51. It may be bolted to pedestal portions 49 and 53 of the transmission casing as best seen in FIGURE 2. Suitable bolts 55 are provided for this purpose.

The valve body 51 includes a tubular extension 57 that defines an inlet fluid flow passage for the tailshaft driven pump. The passage defined by this extension 57 communicates with the aforementioned port 34. In a similar fashion, valve body 51 includes an extension 59 that defines an inlet port for the engine driven pump. The passage defined by the extension 59 communicates with the aforementioned port 32.

When the pan is assembled, the collar 52 registers with extension 57 and forms a portion of the intake passage for the tailshaft driven pump. In a similar fashion the duct 50, together with the baffle or duct 42, defines the intake fluid flow passage for the engine driven pump.

Referring next to FIGURE 4, the filter element is generally indicated by reference character 56. It comprises a sheet of Dacron cloth. According to one preferred embodiment, the cloth is formed of 15 denier fibers and is approximately .004 inch thick. The density of the cloth is 8.5 ounces per square yard and the air permeability is 225 cubic feet per square foot per .5 inch of of water. The cloth can be impregnated with a suitable phenolic resin.

The margin of the cloth 56 is identified by reference character 58 and it can be impregnated with a suitable rubber compound or heavy resin so that it will function adequately as a gasket for the oil pan. It will be observed that the shape of the cloth 56 is similar to the shape of the oil pan.

In assembly, the cloth 56 is placed over the oil pan and the pan then is bolted to the underside of the casing part 12, the margin 58 of the cloth 56 forming a fluid gasket.

The margin 58 of course can be formed with bolt openings that match the bolt openings in the margin 36 of the oil pan.

For the purpose of providing support, I have formed several bosses 60 in the central pan portion 38. The cloth 56 is adapted to rest upon the bosses 60. These bosses can be formed by stamping during the formation of the pan itself.

The cloth 56 is formed with an opening 62 for accommodating the duct 50. Similarly, a grommet 64 may be situated within a cooperating opening in the cloth 56 so that when the cloth s assembled, it will register with the collar 52 and engage and register with port 34. As best seen in FIGURE 10, the grommet 64 has a lip that engages the margins of the hole in the cloth 56 and the hole in collar 52.

The extension 57 is received within the grommet 64 and when the oil pan and filter cloth are assembled as shown in FIGURE 10, a fluid passage is provided from the base of the oil pan and through the passage formed by the extension 57 to the valve body 51. The fluid passage is continued through the valve body and communicates with port 34 as previously explained.

The duct 50 for the baffle 42 is formed with a flattened end 66 as shown in FIGURE 11. It is received within the extension 59 of the valve body 51. A suitable O-ring 68 is located within the opening of extension 59 to form a fluid seal around the circular duct 50.

When the valve body 51 is assembled in place, a fluid intake passage is established through the duct 50 and through the extension 59, the latter communicating through the valve body with the aforementioned port 32 for the engine driven pump.

The valve body 51 has formed therein various exhaust ports through which the fluid is returned to the sump after it passes through the valve system. The high pressure passages of the valve body 51 communicate with the high pressure port 70 for the rear pump and high pressure port 72 for the front pump, these ports being shown in FIGURE 2.

During operation, fluid is drawn from the base of the oil pan through the respective pump intake ducts. The pumps then distribute this fluid under pressure to the various components for the control system. When the fluid is discharged from the valve body 51, it is passed onto the upper surface of the cloth 56. It drains through the cloth under gravity and returns to the base of the oil pan.

The scoop 44 for the intake duct of the front pump is considered necessary in order to prevent starvation of the front pump during operation of the vehicle up an incline.

Having thus described a preferred embodiment of my invention, what I claim and desire to secure by United States Letters Patent is:

In a power transmission mechanism, a transmission casing, a fluid reservoir comprising a shallow pan disposed in a substantially horizontal plane, means for securing said pan to said casing, a fluid pressure pump powered by a rotary portion of said mechanism, a fluid intake conduit extending from the lower region of said pan to the intake side of said pump, a filter cloth extending across the upper region of said pan, the margin of said cloth being disposed between said pan and said casing and defining a gasket therebetween, a fluid pressure control system for said transmission mechanism, said pump being adapted to supply fluid to said system, the fluid discharge from said system being distributed to the upper surface of said cloth whereby filtering action takes place as the fluid is returned to the lower region of said pan under gravity, said intake conduit structure extending through said cloth adjacent one marginal portion thereof, baffle structure secured to the bottom of said pan defining a flow intake duct having an intake portion at a central region of said pan and a discharge portion connected to said intake conduit, said duct comprising a main portion offset from the bottom of said pan and two marginal parts on opposed sides of said main portion, said marginal parts being secured to the bottom of said pan to define therewith said duct, said marginal parts extending from said marginal portion of said cloth to the central region of said pan, the vertical depth of said duct being substantially less in magnitude than the horizontal width thereof, the discharge portion of said duct that is connected to said intake conduit being closed at a location directly adjacent one side of said pan, said intake portion thereby being submerged in the fluid in said pan regardless of displacement of the plane of the surface of said fluid with respect to a horizontal reference line, the bottom of said pan being formed with raised bosses that are adapted to support said cloth.

References Cited by the Examiner

UNITED STATES PATENTS

| | | | |
|---|---|---|---|
| 1,288,302 | 12/18 | Vincent | 210—168 X |
| 1,767,078 | 6/30 | Johnson | 210—490 |
| 1,820,382 | 8/31 | Ellis | 210—168 X |
| 1,846,072 | 2/32 | Whyte | 210—168 X |
| 1,939,765 | 12/33 | Church | 210—168 X |
| 2,147,792 | 2/39 | Knight | 210—445 X |
| 2,624,465 | 1/53 | Kracklauer | 210—344 |
| 2,796,239 | 6/57 | Holmes | 210—172 X |

FOREIGN PATENTS

| | | |
|---|---|---|
| 134,166 | 7/33 | Austria. |
| 259,222 | 11/26 | Great Britain. |

OTHER REFERENCES

Wrotnowski: "Nonwoven Filter Media"; Chemical Engineering Progress, vol. 53, No. 7, July 1957; pages 313–19.

REUBEN FRIEDMAN, *Primary Examiner.*

HARRY B. THORNTON, HERBERT L. MARTIN,
*Examiners.*